United States Patent
Cho et al.

(10) Patent No.: US 9,532,207 B2
(45) Date of Patent: Dec. 27, 2016

(54) VEHICLE CONTROL SYSTEM AND METHOD FOR CONTROLLING SAME

(75) Inventors: Hangyu Cho, Anyang-si (KR); Minseok Oh, Anyang-si (KR); Kyujin Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 14/114,507

(22) PCT Filed: Apr. 30, 2012

(86) PCT No.: PCT/KR2012/003359
§ 371 (c)(1),
(2), (4) Date: Nov. 13, 2013

(87) PCT Pub. No.: WO2012/148240
PCT Pub. Date: Nov. 1, 2012

(65) Prior Publication Data
US 2014/0066049 A1 Mar. 6, 2014

Related U.S. Application Data (60) Provisional application No. 61/480,354, filed on Apr. 28, 2011.

(51) Int. Cl.
*H04M 3/00* (2006.01)
*H04W 4/00* (2009.01)
(Continued)

(52) U.S. Cl.
CPC .............. *H04W 8/18* (2013.01); *B60W 50/085* (2013.01); *H04B 1/3822* (2013.01); *H04B 7/0413* (2013.01); *H04L 67/025* (2013.01); *B60K 2350/35* (2013.01); *B60W 2540/28* (2013.01)

(58) Field of Classification Search
CPC ............................ H04M 1/72572; H04W 8/18
See application file for complete search history.

(56) References Cited

U.S. PATENT DOCUMENTS

2001/0053694 A1* 12/2001 Igarashi .................. H04L 63/08
455/433
2006/0235753 A1* 10/2006 Kameyama ........ B60H 1/00742
705/15
(Continued)

FOREIGN PATENT DOCUMENTS

JP 2002-267458 9/2002
JP 2003-078593 3/2003
(Continued)

OTHER PUBLICATIONS

PCT International Application No. PCT/KR2012/003359, Written Opinion of the International Searching Authority dated Nov. 16, 2012, 20 pages.

*Primary Examiner* — Tammy Paige Goddard
*Assistant Examiner* — Frantz Bataille
(74) *Attorney, Agent, or Firm* — Lee Hong Degerman Kang Waimey (57) ABSTRACT

The present invention provides a vehicle control system comprising: a user database for storing at least one user profile which designates an initial action for an in-vehicle end device; a fixed and wireless communication unit for establishing a communication channel with a mobile terminal and receiving identity information through the communication channel: and a control unit for extracting the user profile corresponding to the identity information from the user database, and controlling the end device so that the end device executes an initial action as designated by the extracted user profile.

17 Claims, 9 Drawing Sheets

(51) Int. Cl.
   *H04W 24/00*    (2009.01)
   *G05D 1/00*     (2006.01)
   *B60Q 1/00*     (2006.01)
   *G06Q 50/00*    (2012.01)
   *H04W 8/18*     (2009.01)
   *B60W 50/08*    (2012.01)
   *H04B 1/3822*   (2015.01)
   *H04B 7/04*     (2006.01)
   *H04L 29/08*    (2006.01)

(56) References Cited

U.S. PATENT DOCUMENTS

| | | | | |
|---|---|---|---|---|
| 2009/0138283 | A1* | 5/2009 | Brown | G06Q 10/109 |
| | | | | 705/3 |
| 2009/0156201 | A1* | 6/2009 | Pudney | H04W 64/00 |
| | | | | 455/426.1 |
| 2010/0222939 | A1* | 9/2010 | Namburu | G07C 9/00111 |
| | | | | 701/2 |
| 2010/0225462 | A1* | 9/2010 | Ito | G08B 25/016 |
| | | | | 340/438 |
| 2011/0077028 | A1* | 3/2011 | Wilkes, III | B60W 50/14 |
| | | | | 455/456.3 |

FOREIGN PATENT DOCUMENTS

| | | |
|---|---|---|
| KR | 20-0291353 | 10/2002 |
| KR | 10-2010-0116380 | 11/2010 |
| WO | 2010-131445 | 11/2010 |

* cited by examiner

VEHICLE CONTROL SYSTEM AND METHOD FOR CONTROLLING SAME

CROSS-REFERENCE TO RELATED APPLICATIONS

This application is the National Stage filing under 35 U.S.C. 371 of International Application No. PCT/KR2012/003359, filed on Apr. 30, 2012, which claims the benefit of U.S. Provisional Application Ser. No. 61/480,354, filed on Apr. 28, 2011, the contents of which are hereby incorporated by reference herein in their entirety.

TECHNICAL FIELD

The present invention relates to an apparatus for controlling a vehicle and method therefor, by which user's convenience can be enhanced.

BACKGROUND ART

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

Figure 1:
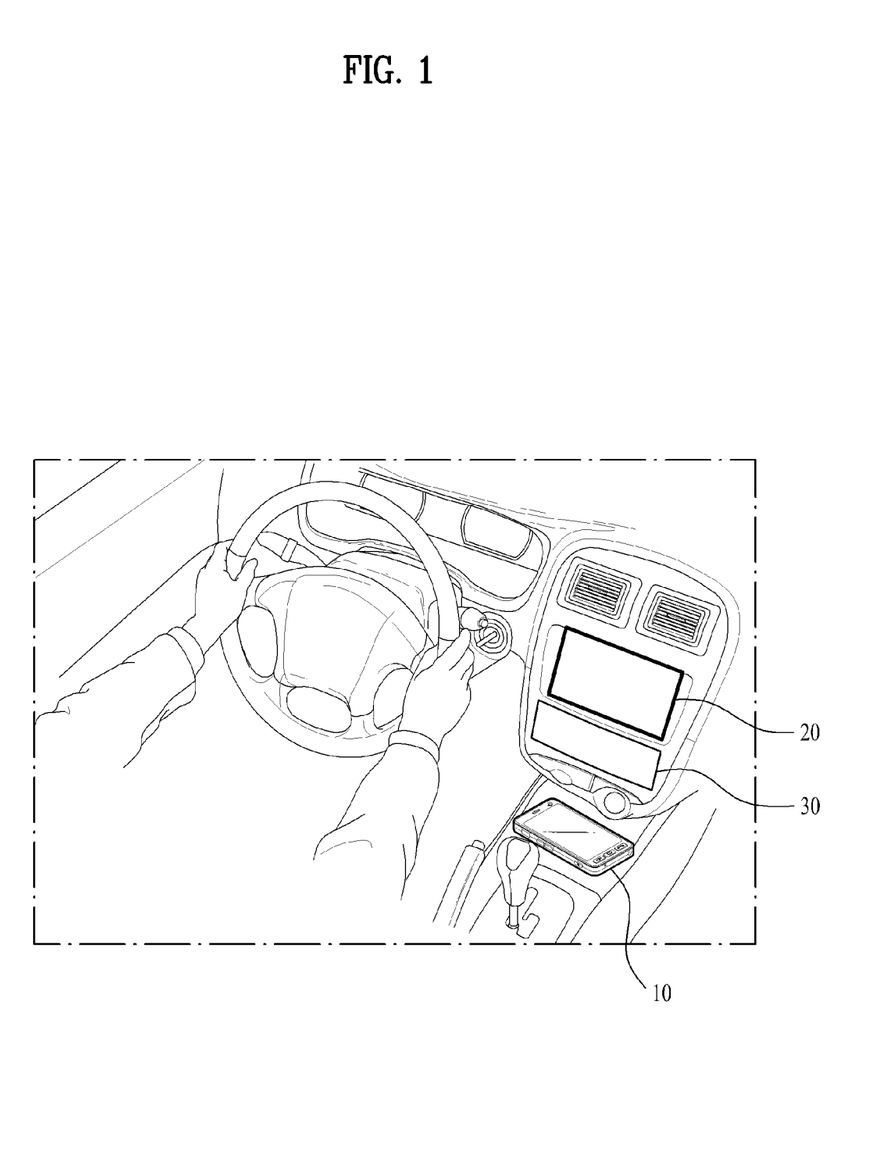
FIG. 1 is a diagram for one example of connecting a mobile terminal and a display device to each other.

Moreover, it is able to use such a device provided to a vehicle as a display device, an audio device and the like using a mobile terminal. FIG. 1 is a diagram for one example of connecting a mobile terminal and a display device to each other. Referring to FIG. 1, a user connects a mobile terminal 10 to a display device 20 or an audio device 30 of a vehicle in order to control a video outputted from the mobile terminal 10 to be outputted through a display of the vehicle or control an audio outputted from the mobile terminal 10 to be outputted through an audio device 30. However, a vehicle control using the mobile terminal 10 is effective only to control such a device installed on the vehicle as the audio device 30, the display device 20 and the like.

Recently, the needs for adjusting various devices including the audio device and the display device using wire/wireless communications provided by a mobile terminal is increasingly rising.

DISCLOSURE OF THE INVENTION

Technical Tasks

Accordingly, the present invention is directed to substantially obviate one or more problems due to limitations and disadvantages of the related art. First of all, an object of the present invention is to provide an apparatus for controlling a vehicle and method therefor, by which convenience of a vehicle user can be enhanced.

In particular, one object of the present invention is to enable an end device of a vehicle to be automatically adjusted in accordance with an initial environment designated by a user when the user gets in the vehicle.

Another object of the present invention is to raise efficiency of a navigation device in a manner of automatically setting a traveling destination suitable for a situation of a driver of a vehicle.

A further object of the present invention is to freely enable data communications among a plurality of mobile terminals within a vehicle.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, an apparatus for controlling a vehicle according to the present invention includes a user database configured to store at least one user profile designating an initial operation of an end device in the vehicle, a wire/wireless communication unit configured to establish a communication channel with a mobile terminal, and receive identification information through the communication channel, and a control unit configured to extract a user profile matching the identification information from the user database, and control the end device to operate in accordance with the initial operation designated by the extracted user profile.

Preferably, after detecting a vehicle boarding of a user, the control unit may control the wire/wireless communication unit to establish the communication channel.

Preferably, the end device may include an electronic motor configured to adjust a height of a car seat in the vehicle and/or an inclination of a back support of the car seat in the vehicle.

Preferably, the end device may include a navigation device, the control unit may automatically determine a destination based on data received from the mobile terminal, and the control unit may then provide the determined destination to the navigation device.

Advantageous Effects

Accordingly, an apparatus for controlling a vehicle and method therefor according to the present invention may provide the following effects and/or advantages.

According to at least one of embodiments of the present invention, convenience of a vehicle user can be enhanced.

In particular, according to at least one of embodiments of the present invention, it is able to control an end device of a vehicle to automatically operate in accordance with an initial environment designated by a user when the user gets in the vehicle.

And, according to at least one of embodiments of the present invention, efficiency of a navigation device can be raised in a manner of automatically setting a traveling destination suitable for a situation of a driver of a vehicle.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

A mobile terminal 100 mentioned in the description of the present invention may include one of a mobile phone, a smart phone, a laptop computer, a digital broadcast terminal, a PDA (personal digital assistants), a PMP (portable multimedia player) and the like.

Figure 2:
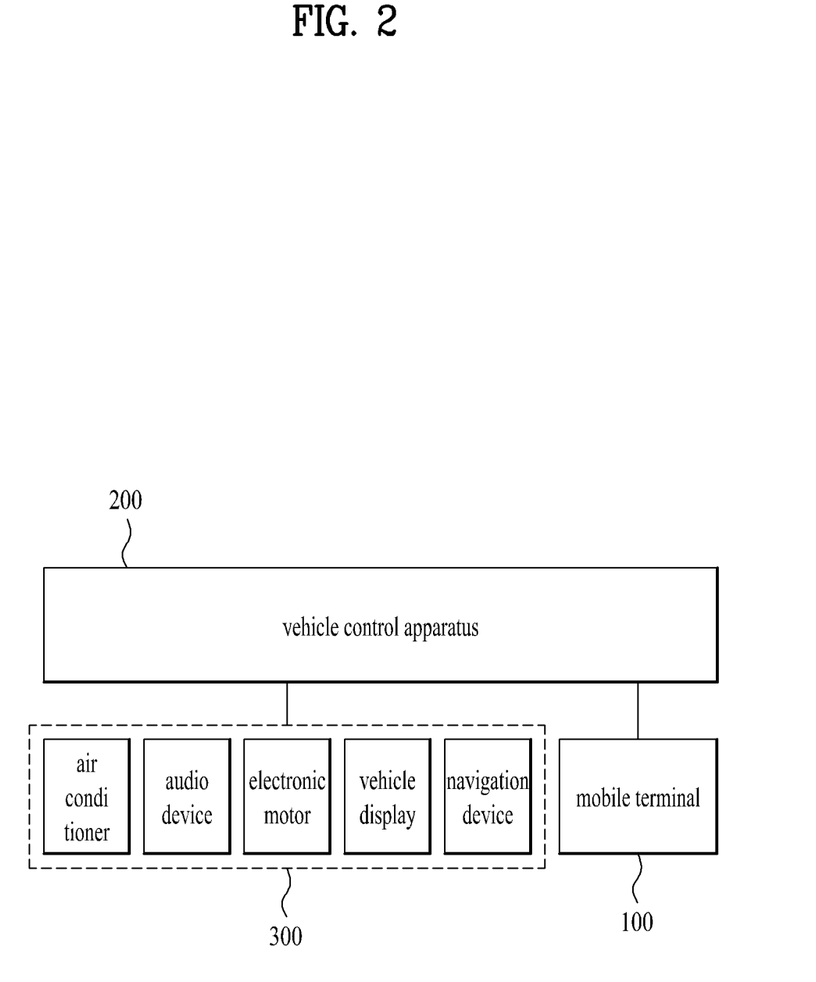
FIG. 2 is a schematic diagram of a vehicle control system using a vehicle control apparatus according to the present invention.

FIG. 2 is a schematic diagram of a vehicle control system using a vehicle control apparatus according to the present invention. Referring to FIG. 2, a vehicle control system includes a mobile terminal 100, a vehicle control apparatus 200 and an end device 300.

The mobile terminal 100 stores identification information and is then able to provide the identification information to the vehicle control apparatus 200. In this case, the identification information includes an identification information for identifying the mobile terminal 100. As the identification information for identifying the mobile terminal 100, it may be able to use at least one of a phone number of the mobile terminal 100, IMEI and S/N or such a user identification information as a user name, a nickname, a face image, a fingerprint and the like, by which the identification information may be non-limited.

The mobile terminal 100 can provide the identification information to the vehicle control apparatus 200 through a wire/wireless interface. In case that the mobile terminal 100 provides the identification information to the vehicle control apparatus 200 by wireless communication, the mobile terminal 100 can use a wireless tag system (e.g., NFC, RFID, etc.), a short-range communication technology (e.g., Bluetooth, UWB, Zigbee, etc.), or a wireless internet technology (e.g., WLAN, CDMA, LTE, Wibro, HSPDA, etc.). In case of using the wireless tag system such as NFC, RFID and the like, a user brings the mobile 100 close to an NFC module or RFID reader installed on a vehicle and is then able to transmit the identification information to the vehicle control apparatus 200.

In case that the mobile terminal 100 provides the identification information to the vehicle control apparatus 200 by wire communication, the mobile terminal 100 may be able to provide the identification information to the vehicle control apparatus 200 using the connection by USB specifications. Yet, the above-enumerated wire/wireless communication specifications are exemplary, by which a means for connecting the mobile terminal 100 and the vehicle control apparatus 200 according to the present invention may be non-limited.

The vehicle control apparatus 200 recognizes a user got in the vehicle through the mobile terminal 100 and then plays a role in adjusting the end device 300 to correspond to pre-settings of the recognized user. In particular, if the mobile terminal 100 is detected, the vehicle control apparatus 200 performs authentication of the mobile terminal 100 by obtaining the identification information from the mobile terminal 100, searches for a user profile that matches the identification information of the mobile terminal 100, and is then able to generate a control signal for adjusting an operation of the end device 300 in accordance with the user profile.

The vehicle control apparatus 200 can collect state information of the vehicle from various sensors of the vehicle. For instance, the vehicle control apparatus 200 detects a proximate object from a proximity sensor attached to or recessed in a body of the vehicle or can collect information on a closed/open state of a vehicle door from a door open/closed sensor. Moreover, the vehicle control apparatus 200 can collect an engine temperature or a vehicle room temperature from a temperature sensor.

The end device 300 includes devices of which operations are controlled by the vehicle control apparatus 200. The end device 300 and the vehicle control apparatus 200 can communicate with each other by wire/wireless. For instance, the end device 300 may include a vehicle display configured to provide an image output to a passenger, a navigation device configured to compute navigation information, an audio device configured to output audio, an air conditioner configured to adjust a room temperature of the vehicle, an electronic motor configured to adjust a height level of a car seat, an inclination level of a back support of the car seat and the like. In this case, the navigation device may include another display separate from the vehicle display or may display the navigation information through the vehicle display.

In this case, the vehicle display may include a center fascia display provided to a center fascia of the vehicle and a seat screen. The center fascia display includes a display provided to a dashboard center between a driver seat and a seat next to a driver. And, the seat screen may include a display provided to a head rest or a back of a front seat in consideration of a back-seat passenger.

The present invention relates to the vehicle control apparatus 200 configured to deliver control signals between the mobile terminal 100 and the end device 300 of the vehicle among the components shown in FIG. 2. In the following description, the present invention is explained in detail based on the operations of the vehicle control apparatus 200 shown in FIG. 2.

Figure 3:
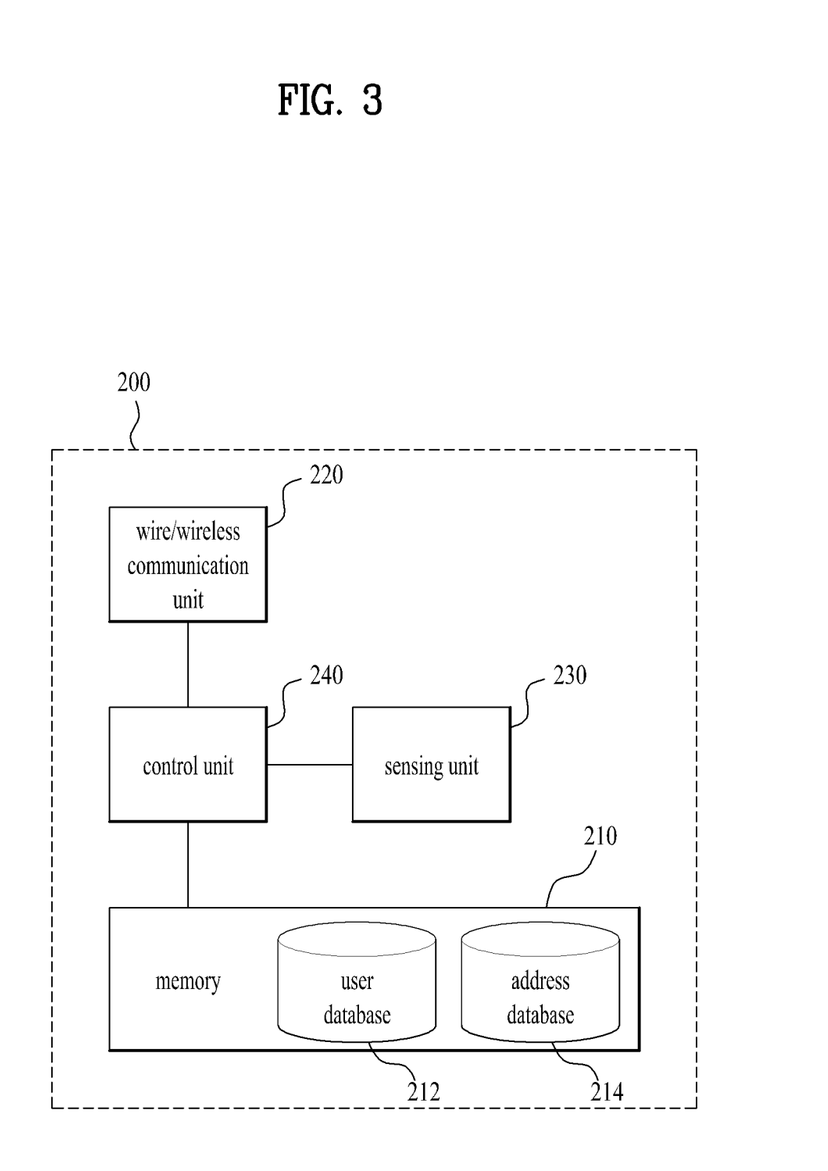
FIG. 3 is a block diagram of the vehicle control apparatus shown in FIG. 2.

FIG. 3 is a block diagram of the vehicle control apparatus shown in FIG. 2. Referring to FIG. 3, the vehicle control apparatus 200 may include a memory 210 configured to store a user database 212 and an address database 214, a wire/wireless communication unit 220, a sensing unit 230 and a control unit 240.

The components shown in FIG. 3 shall be described in detail with reference to an operational flowchart of the vehicle control apparatus 200 shown in FIG. 4 as follows.

Figure 4:
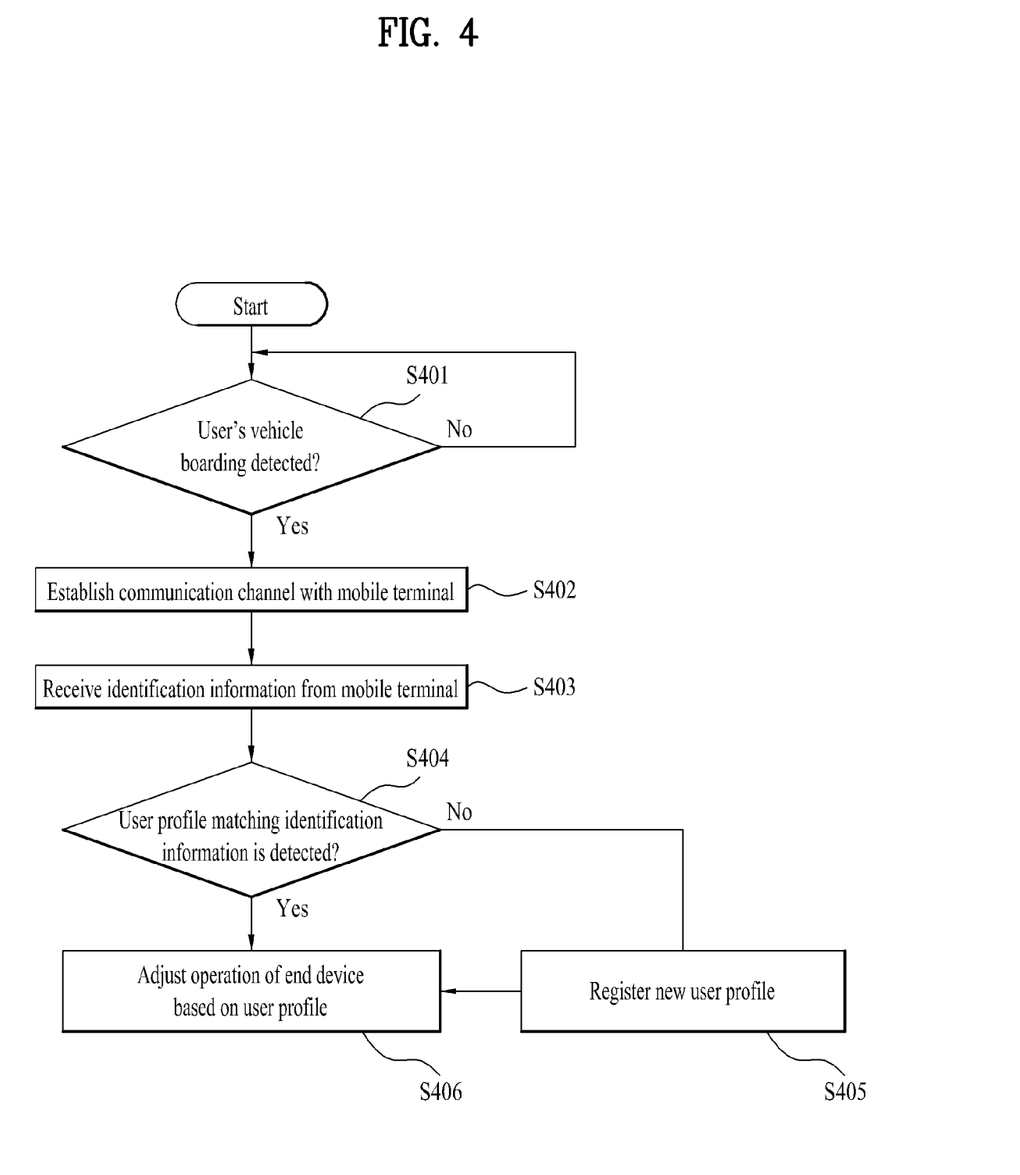
FIG. 4 is a flowchart for an operation of an apparatus for controlling a vehicle according to one embodiment of the present invention.

FIG. 4 is a flowchart for an operation of an apparatus for controlling a vehicle according to one embodiment of the present invention. A first step described in the operational flowchart shown in FIG. 4 relates to a step S401 for the control unit 240 to detect a boarding of a user using the sensing unit 230. For instance, the vehicle control apparatus 200 can detect a presence or non-presence of the boarding of the user using a proximity sensor provided to the vehicle body. A process for the vehicle control apparatus 200 to detect the boarding of the user using the proximity sensor shall be described in detail with reference to FIG. 5 as follows.

Figure 5:
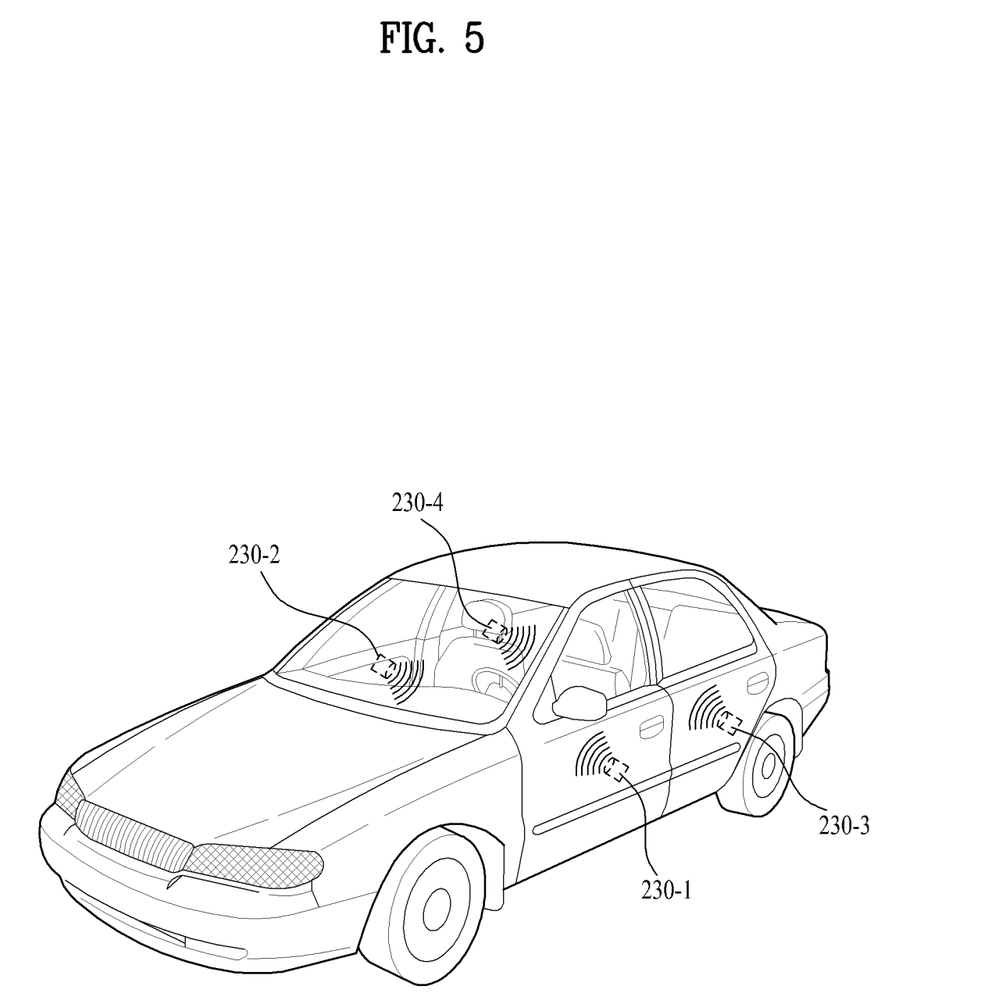
FIG. 5 is a diagram for one example to describe a process for detecting a boarding of a user using a proximity sensor.

FIG. 5 is a diagram for one example to describe a process for detecting a boarding of a user using a proximity sensor. In the example shown in FIG. 5, is to fourth proximity sensors 230-1 to 230-4 are attached to insides of 4 vehicle doors, respectively. In the example shown in FIG. 5, if a user sits on a driver seat, the control unit 240 may detect that the user has get in the vehicle based on a detection signal of the first proximity sensor 230-1. On the other hand, if a user sits on a passenger seat next to a driver, the control unit 240 may detect a boarding of a user through the second proximity sensor 230-2. If a user sits on a passenger seat behind the driver seat, the control unit 240 may detect a boarding of the user through the third proximity sensor 230-3. If a user sits on a passenger seat behind the seat next to the driver, the control unit 240 may detect a boarding of the user through the fourth proximity sensor 230-4. In particular, the vehicle control apparatus 200 can detect whether a user has get in the vehicle using the proximity sensor provided to each of the vehicle doors.

Although FIG. 5 shows one example that the proximity sensor is installed at the vehicle door, it may be unnecessary for the proximity sensor to be provided to the vehicle door. For instance, the proximity sensor may be attached to a car seat or a foot board.

Moreover, it may not be mandatory for a boarding location of a user to be detected through the proximity sensor shown in FIG. 5. Alternatively, the control unit 240 may determine a seat, on which a user will sit, depending on an open/closed position of the vehicle door. For instance, in case of detecting that the vehicle door next to the driver seat is opened, the vehicle control apparatus 200 may predict that a user will seat on the driver seat. In case of detecting that the vehicle door next to the seat next to a driver is opened, the vehicle control apparatus 200 may predict that a user will seat on the seat next to the driver.

For another instance, it is able to detect a user depending on whether a prescribed pressure is applied to a pressure sensor. In this case, the pressure sensor can be installed at a part pressurized by a boarding of a user, i.e., a footboard or a sitting board of a car seat. In doing so, if a user seats on the driver seat, the pressure sensor provided to the driver seat of the vehicle will be pressurized. If a user seats on the seat next to the driver of the vehicle, the pressure sensor provided to the vehicle seat next to the driver will be pressurized. Therefore, the vehicle control apparatus 200 can detect a boarding of a user depending on whether the pressure sensor senses a pressure equal to or greater than a prescribed pressure.

Meanwhile, it is able to at least two of the proximity sensor, the door open/close sensor and the pressure sensor simultaneously. If all the at least two sensors sense a user or at least one of the at least two sensors senses a user, the control unit 240 can determine that the user has got in the vehicle.

Once the vehicle boarding of the user is detected, the control unit 240 can control a communication channel to be established with the user's mobile terminal 100 [S402]. After the user has been on board, the communication channel is established. This is to remote the security threat by preventing an unspecified person having no relation with the vehicle from accessing a network provided by the vehicle.

Once the communication channel is established between the mobile terminal 100 and the vehicle control apparatus 200, the control unit 240 receives the identification information from the mobile terminal 100 [S403] and is then able to search the user database 212 for a presence or non-presence of a user profile that matches the identification information [S404]. In this case, the identification information can include such an identification information of the mobile terminal 100 as a phone number of the mobile terminal, an IMEI of the mobile terminal 100, an S/N of the mobile terminal 100 and the like or such a user identification information as a user's face, a user's fingerprint and the like. In case of using the user's face, the user's fingerprint or the like, the vehicle control apparatus 200 may obtain a user's face image recognized from a camera of the mobile terminal 100 or a fingerprint image recognized from a fingerprint recognizer of the mobile terminal 100.

The user file authenticates the user of the mobile terminal 100 and also stores setup values related to an initial environment of the vehicle. The control unit 240 processes the authentication of the mobile terminal 100 using the user profile and can control the end device 300 to operate in accordance with an initial operation determined by the user profile. In particular, the control unit 240 is able to perform the authentication of the mobile terminal 100 by determining whether the identification information obtained from the mobile terminal 100 and the identification information included in the user profile match each other. In doing so, if the user's face image is used as the identification information, the control unit 240 can authenticate the mobile terminal 100 in a manner of determining whether a character indicated by the face image obtained from the mobile terminal 100 matches a character indicated by the face image included in the user profile. In this case, the control unit 240 may perform the authentication of the mobile terminal 100 using face recognition algorithm.

If a user profile is not stored, the control unit 240 can control a setting screen for the registration of the user profile to be outputted through at least one of the center fascia display, the seat screen and the mobile terminal 100 [S405].

Figure 6:
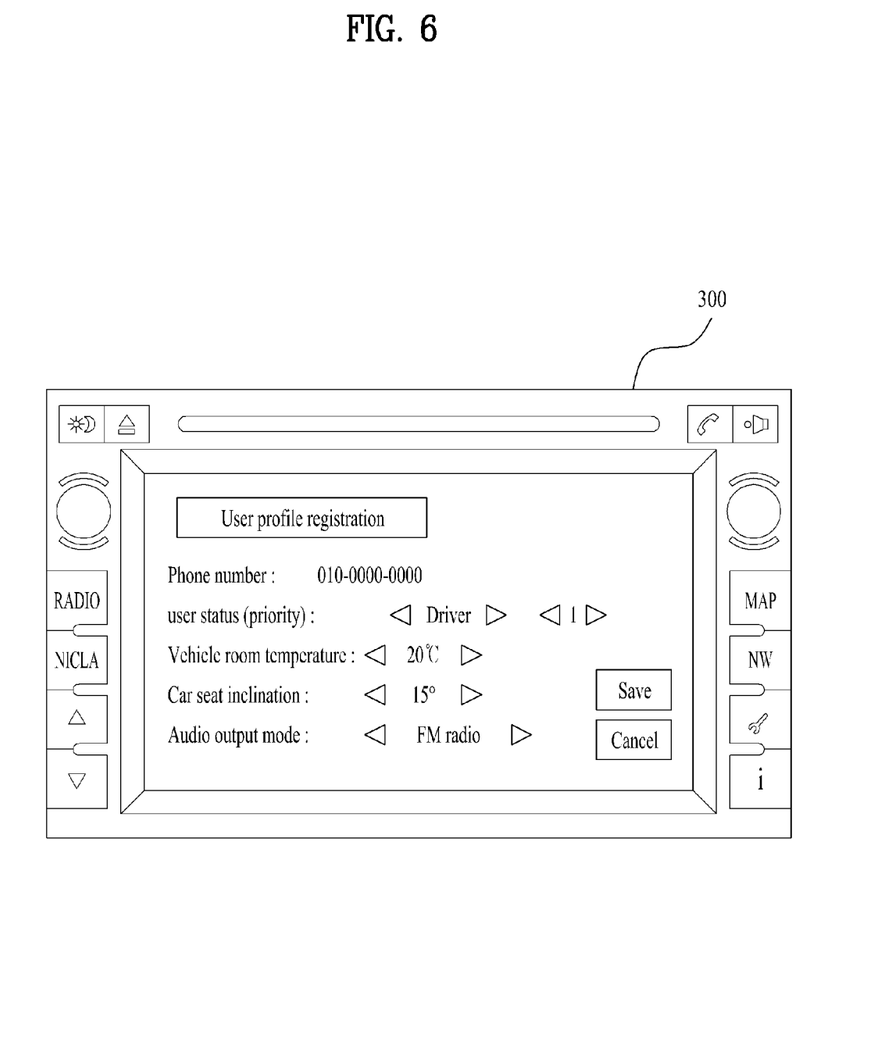
FIG. 6 is a diagram for one example of a process for outputting a setting screen for user profile registration through a vehicle display or a mobile terminal.

FIG. 6 is a diagram for one example of a process for outputting a setting screen for user profile registration through a vehicle display or a mobile terminal 100. Referring to FIG. 6, if a user profile is not saved in the user database, the control unit 240 can provide a user with a setting screen for registering the user profile. In the user profile, setup values related to an initial operation of the end device 300 can be recorded together with an identification information (e.g., a phone number in the example shown in FIG. 6) for identifying a user. In the example shown in FIG. 6, setting items include a vehicle room temperature, an inclination of a back support of a car seat, an output mode of an audio device and the like.

In the example shown in FIG. 6, a status of a user (e.g., an information indicating whether a user is a driver) can be further set as well as the identification information and the setup values related to the initial operation of the end device 300. Thus, the status of the user is further included. If so, when a plurality of mobile terminals 100 are connected to the vehicle control apparatus 200, a user file having a high status (i.e., a high priority) can be preferentially applied. FIG. 6 shows one example that the status of the user is set depending on whether a user is a driver, by which the present invention may be non-limited. For instance, it is able to designate a priority of a user profile using a numeral. If the user profile is written using the information whether the user is the driver, as shown in FIG. 6, it is advantageous in that an intuitive interface can be provided to the user. Yet, to prepare for a case that a plurality of users are registered as drivers, it may be necessary to designate priorities among the drivers.

Once the user profile writing is complete, the control unit 240 saves the user profile in the user database 212 and is then able to adjust an operation of the end device 300 based on the created user profile [S406]. Since the created user profile is saved as a user database in the memory, it is advantageous in that the user can be provided with the same environment each time through a once-only user profile registration process. In particular, after the user file has been registered once, since the end device 300 will be adjusted by the initial operation designated by the user profile each time the user gets in the vehicle, the user can get in the vehicle that provides the same environment each time.

Likewise, if the user profile matching the identification information is found from the user database 212 [S404], the control unit 240 can adjust the operation of the end device 300 based on the found user profile [S406]. In particular, the control unit 204 can control the end device 300 to operate in accordance with the initial operation determined by the user profile.

For instance, in the example shown in FIG. 6, if a desired internal temperature is set to 20° C., the control unit 240 can control an air conditioner to adjust the vehicle room temperature into the set temperature.

For another instance, in the example shown in FIG. 6, if an inclination level of a back support of a car seat is set to 15°, the control unit 240 can deliver a control signal to an electronic motor for adjusting the inclination of the back support of the car seat to enable the inclination level of the back support of the car seat to become 15°.

For another instance, in the example shown in FIG. 16, if an audio device is set to operate in FM radio mode, the control unit 240 turns on a power of the audio device and is then able to control the audio device to output FM radio.

Thus, once a user gets in a vehicle, the vehicle control apparatus 200 can control the end device 300 to be adjusted into an initial value of the end device 300 set in a user profile. Since the end device 300 of the vehicle is controlled to be adjusted in accordance with an initial state set up by the user, it is unnecessary for the user to manually adjust the end device 300 in the vehicle. The user connects the mobile terminal 100 and the vehicle control apparatus 200 to each other, thereby controlling the vehicle to enter a desired state conveniently.

In FIG. 4, after the vehicle control apparatus 200 has detected the boarding of the user [S401], the wireless communication unit is activated [S402]. Yet, it may be unnecessary for the step S401 to be performed. Instead, the vehicle control apparatus 200 may operate by skipping the step S401 among the above-mentioned steps. In case that the step S401 is skipped, the user can control operations of the end devices 300 to be remotely controlled before getting in the vehicle.

Moreover, the step S401 may be performed before the step S406 is performed. In particular, although the user profile is extracted based on the communication with the mobile terminal 100, if the user does not get in the vehicle, the control unit 240 may not perform the control of the end device 300. In this case, on the condition that the user's vehicle boarding is detected, the control unit 240 can control an operation of the end device 300 to be adjusted in accordance with an initial environment determined by the user profile.

The vehicle control apparatus 200 according to the present invention can control an operation of the end device 300 to be adjusted in accordance with a current situation of the mobile terminal 100. In the following description, one example of a process for the vehicle control apparatus 200 to adjust an operation of the end device 300 by recognizing a situation of the mobile terminal 100 is explained in detail with reference to the accompanying drawings.

First Embodiment

Figure 7:
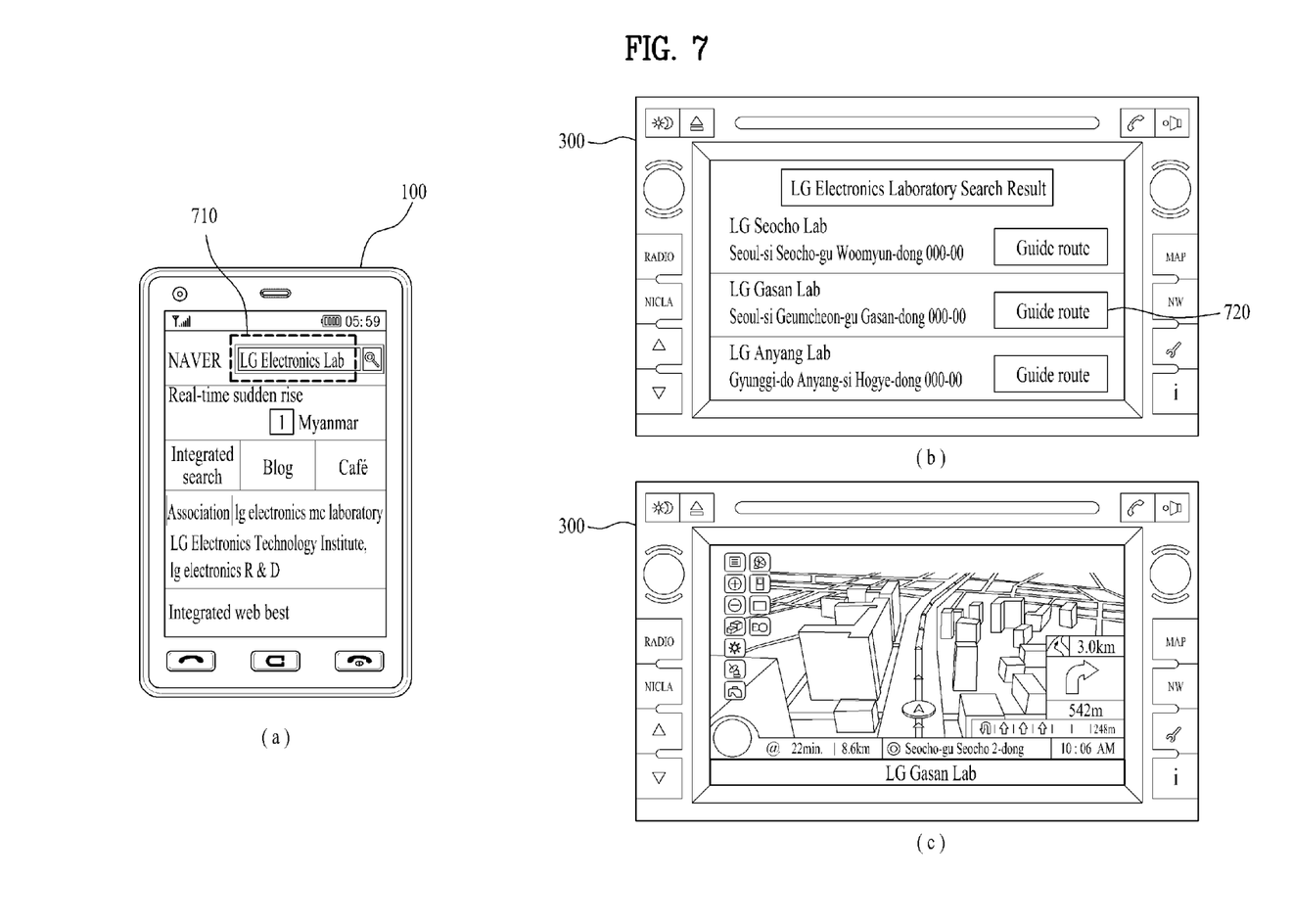
FIGS. 7(a) to 7(c) are diagrams for one example to describe a process for a vehicle control apparatus to perform a navigation function using a record of an access to a webpage read by a user.

The vehicle control apparatus 200 according to the present invention receives a record of an access to a webpage read by a user, detects a destination the user intends to go to, and is then able to control a navigation device to activate a navigation function having a destination set to the detected destination. In particular, the vehicle control apparatus 200 automatically computes a destination based on a keyword inputted through the mobile terminal 100 by the user and is then able to provide the computed destination to the navigation device.

FIGS. 7(a) to 7(c) are diagrams for one example to describe a process for the vehicle control apparatus 200 to perform a navigation function using a record of an access to a webpage read by a user. Referring to FIG. 7(a), if a user accesses a webpage through the mobile terminal 100 and then inputs a prescribed keyword thereto, the mobile terminal 100 can save a webpage access record (e.g., URL address) in which the webpage read by the user is recorded. The control unit 240 of the vehicle control apparatus 200 receives the webpage access record from the mobile terminal through the wireless communication unit and is then able to extract the keyword inputted by the user from the received webpage access record.

In particular, since the keyword extracted through the URL address is encoded by one of UTF-8, EUC-KR, ISO-2022-KR and ISO-2022-Int in case of Korean or by one of KSC5636 and US-ASCII in case of English, the control unit 240 may be able to extract the keyword inputted by the user by decoding the URL address by the encoding scheme.

Subsequently, the control unit 240 can determine whether an item matching the extracted keyword exists in the address database 214. In particular, referring to FIG. 7(a), in case that the user inputted keyword relates to a place (e.g., 'LG Electronics Laboratory' in FIG. 7(a)), the control unit 240 extracts an address of the place matching the user inputted keyword from the address database 214 and is then able to control a navigation function to be activated in a manner of having a destination set to the extracted address.

In case that a plurality of places matching the user inputted keyword are extracted, referring to FIG. 7(b), the control unit 240 can control a destination list to be displayed in a manner that destinations are listed in order of a distance closer to a current location. If a specific destination is selected from the destination list, referring to FIG. 7(c), the control unit 240 can control the navigation device to activate the navigation function in a manner that the destination of the navigation function is set to the selected specific destination. Thereafter, if a route guide button 720 shown in FIG. 7(c) is selected, the navigation device can start the guide of the route to the destination from a current vehicle location.

According to the present embodiment, the control unit 240 can use the webpage access records by starting with a latest webpage access record. In particular, the control unit 240 can extract a destination intended by a user in a manner of extracting a keyword in order reverse to a webpage access record created order. Generally, a user searches for a destination using internet before starting to drive a vehicle.

Second Embodiment

The vehicle control apparatus 200 according to the present invention receives a phonebook from the mobile terminal 100 and is then able to save the received phonebook in the memory 210. In this case, a name, phone number and address of an acquaintance may be included. The control unit 240 can control a latest version of the phonebook to be maintained in the memory 210 by synchronizing the phonebook each time a communication channel with the mobile terminal 100 is established.

Figure 8:
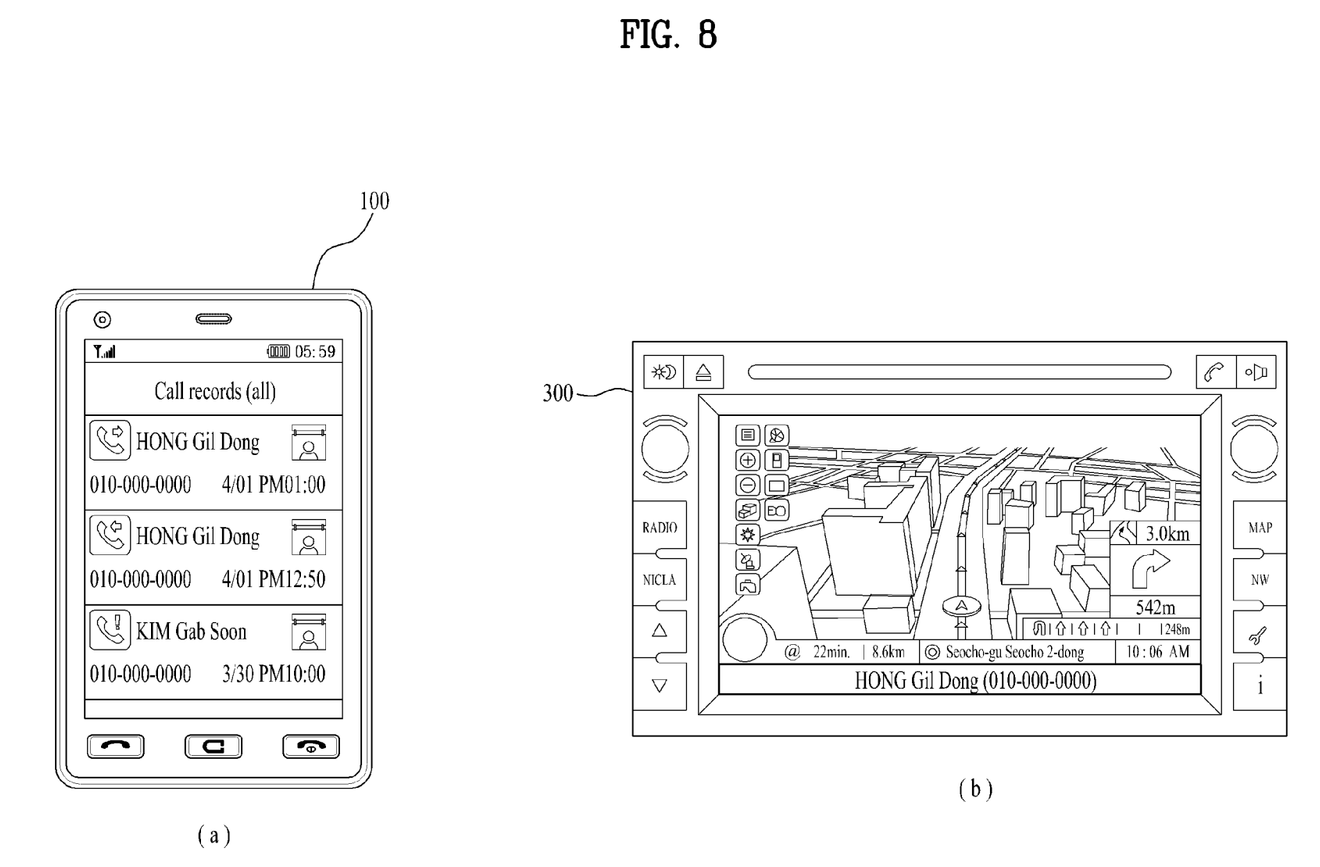
FIG. 8(a) and FIG. 8(b) are diagrams for one example to describe a process for a vehicle control apparatus to perform a navigation function using a call record of a mobile terminal.

Thereafter, the vehicle control apparatus 200 can receive a call record from the mobile terminal 100. The control unit 240 detects a destination desired by a user by analyzing the call record received from the mobile terminal 100 and is then able to control the navigation device to activate a navigation function having a destination set to the detected destination. In particular, the vehicle control apparatus 200 can determine whether an item matching the phone number of a call received/sent by the user through the mobile terminal 100 exists in the phonebook saved in the memory 210. If the item matching the phone number of the call received/sent by the user through the mobile terminal 100 exists, the control unit 240 can control the navigation device to activate the navigation function having a destination set to an address linked to the corresponding phone number.

FIG. 8(a) and FIG. 8(b) are diagrams for one example to describe a process for a vehicle control apparatus 200 to perform a navigation function using a call record of a mobile terminal 100. Referring to FIG. 8(a), the mobile terminal 100 can save a list of phone numbers of calls received or sent through the mobile phone 100. The control unit 240 of the vehicle control apparatus 200 receives a call record from the mobile terminal 100 through the wireless communication unit and is then able to search the phone numbers saved in the memory 210 for item(s) matching the phone number of the incoming or outgoing call.

If the phone number matching the call record is extracted from a phonebook, referring to FIG. 8(b), the control unit 240 can control the navigation device to activate the navigation function having a destination set to an address corresponding to the extracted phone number.

According to the present embodiment, the control unit 240 can extract a destination desired by a user in order of a most recently occurring call record to an earliest occurring call. Moreover, the control unit 240 can receive a call record within a prescribed time from a timing point of establishing the communication channel with the mobile terminal 100. For instance, since it is highly probable that a call record occurring long time ago like a call record occurring a week before a user's boarding on a vehicle has nothing to do with a destination desired by the user, if such a call record is excluded, it is able to prevent unnecessary computation performed by the control unit 240.

Moreover, the control unit 240 can extract a destination desired by a user using a record of an outgoing call sent from the mobile terminal 100 only in the call record. In this case, if a call is made to a destination, the destination desired by the user can be set. Therefore, the user can be provided with convenience.

Third Embodiment

According to the second embodiment, the vehicle control apparatus 200 receives a call record saved in the mobile terminal 100 and then searches for a destination desired by a user. Moreover, the vehicle control apparatus 200 can extract a destination desired by a user in a manner of reflecting a real-time call situation of the mobile terminal 100. For instance, while a vehicle is travelling, if there is an incoming call to the mobile terminal or an outgoing call is attempted by a user using the mobile terminal 100, the control unit 240 can control the navigation device to set a destination to be set to an address corresponding to a phone number of the incoming or outgoing call.

In doing so, as mentioned in the foregoing description of the second embodiment, the control unit 240 may extract the destination desired by the user using the phone number of the outgoing call sent from the mobile terminal 100 only. Thus, the user can set up a destination of the navigation device by making a call to the destination at any time in the course of travelling.

Fourth Embodiment

The vehicle control apparatus 200 according to the present invention is linked to a schedule management application of the mobile terminal 100, detects a destination desired by a user, and is then able to control the navigation device to activate a navigation function having a destination set to the detected destination. In particular, the vehicle control apparatus 200 determines a next schedule of the user in the schedule management application and is then able to set a destination to a place corresponding to the next schedule.

Figure 9:
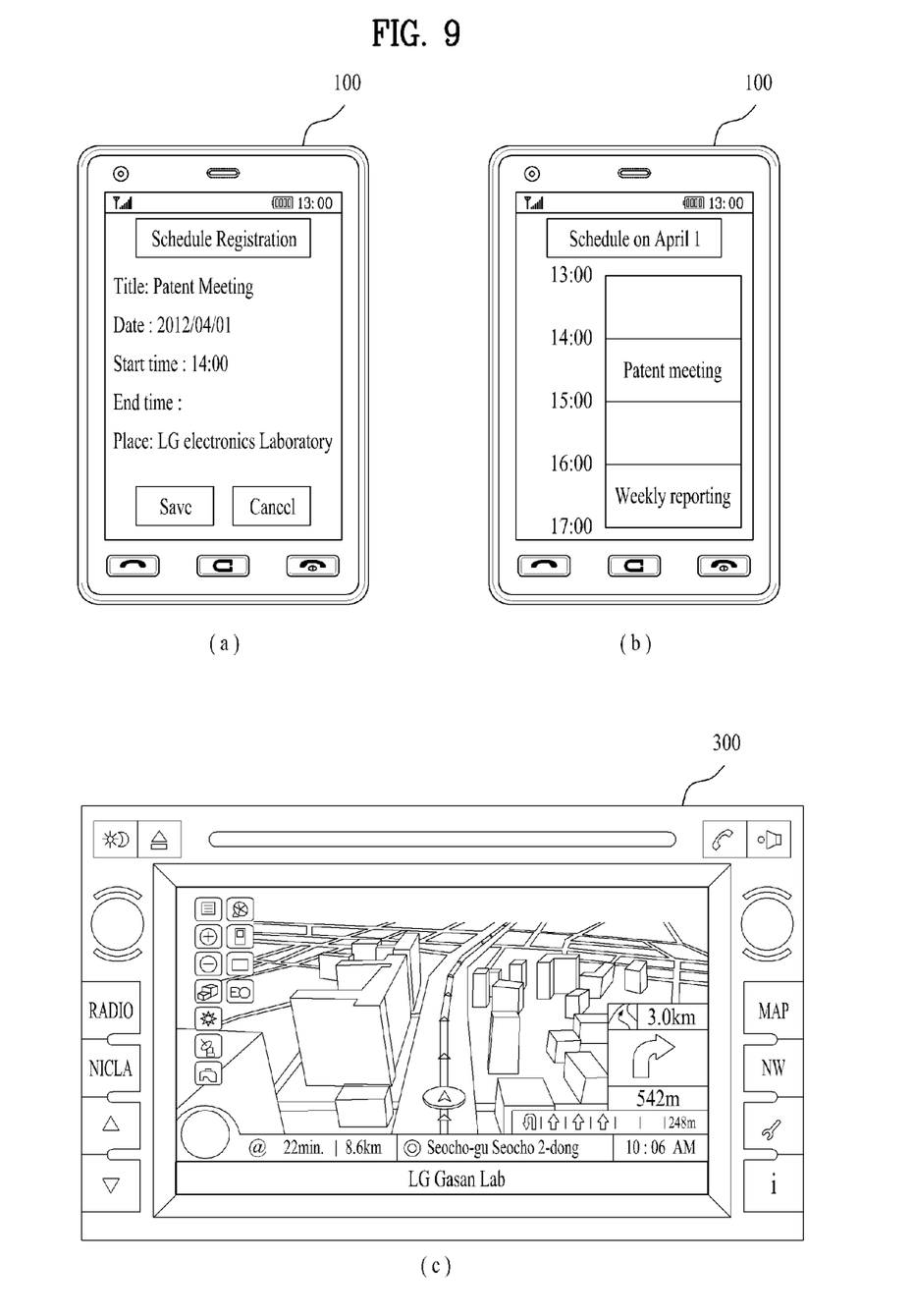
FIGS. 9(a) to 9(c) are diagrams for one example to describe a process for connecting a schedule management application of a mobile terminal and a vehicle control apparatus to each other.

In the following description, a process for linking the vehicle control apparatus 200 to the schedule management application of the mobile terminal 100 is explained in detail with reference to FIG. 9.

FIGS. 9(a) to 9(c) are diagrams for one example to describe a process for connecting a schedule management application of a mobile terminal 100 and a vehicle control apparatus 200 to each other. Referring to FIG. 9(a), a user can register a schedule through a schedule management application. In the example shown in FIG. 9(a), the schedule can be registered in a manner of inputting a start time of the schedule, an end time of the schedule, a scheduled location of the schedule and the like. If the user registers the schedule, referring to FIG. 9(b), the mobile terminal 100 can display a schedule list to enable the schedule registered by the user to be checked by dates.

The vehicle control apparatus 200 receives the schedule registered by the user from the mobile terminal 100 and is then able to determine a next schedule of the user by comparing a current hour to the schedule start time. In particular, the control unit 240 receives a schedule list from the mobile terminal 100, saves the received schedule list in the memory 210, and is then able to select a schedule having a start time closest to a current hour from the received schedule list. In more particular, the control unit 240 can determine the schedule estimated as coming earliest with reference to the current hour as the next schedule of the user. For instance, in the example shown in FIG. 9(b), when a current hour is 13:00, a next schedule of the user may include a patent meeting scheduled to start at 14:00.

Subsequently, the control unit 240 can extract an address of a place (e.g., LG Electronics Laboratory in the example shown in FIG. 9(a)), in which the next schedule of the user will start, from the database 214. Once the address of the place of the next schedule occurrence is extracted from the address database 214, the control unit 240 can control the vehicle display to display the extracted address. In case that a plurality of addresses corresponding to the place in which the schedule will occur are extracted, referring to FIG. 9(b), the control unit 240 can display a destination list in order of a distance closer to a current location. If a specific destination is selected in the example shown in FIG. 9(b), referring to FIG. 9(c), the control unit 240 can control the navigation device to activate the navigation function having a destination set to the selected specific destination. Subsequently, if a route guide button shown in FIG. 9(c) is selected, the control unit 240 can control the navigation device to start a guide of a route to the destination from a current location of the vehicle.

Fifth Embodiment

The vehicle control apparatus 200 can build a multiscreen environment in a manner that a display screen of the mobile terminal 100 is outputted through a vehicle display. In particular, the control unit 240 receives video data from the mobile terminal 100 through the wire/wireless communication unit 220 and is then able to control the received video data to be displayed through the center fascia display and/or the seat screen. As the same screen of the mobile terminal 100 is provided to the vehicle display, it is able to build the multiscreen environment in the vehicle.

Moreover, the vehicle control apparatus 200 can control audio data generated from the mobile terminal 100 to be outputted through the audio device. In particular, the control unit 240 receives the audio data from the mobile terminal 100 through the wire/wireless communication unit 220 and is then able to control the received audio data to be outputted to the audio device. By controlling the audio data generated from the mobile terminal 100 to be outputted through the audio device, it is able to build an environment in which all passengers can appreciate the same audio and video.

The present embodiment may be implemented only if multimedia contents are played in the mobile terminal 100. For instance, when the mobile terminal 100 in the course of playing a music or video content is connected to the vehicle control apparatus 200 or a user intends to play the music or video content through the mobile terminal 100 after the connection between the mobile terminal 100 and the vehicle control apparatus 200, the vehicle control apparatus 200 can control the audio and/or video data generated from the mobile terminal 100 to be outputted through the end device 300.

Sixth Embodiment

Although the description of the first/fifth embodiment relates to the example that 1:1 communication is performed between the vehicle control apparatus 200 and the mobile terminal 100, it may be unnecessary for the vehicle control apparatus 200 and the mobile terminal 100 to perform the 1:1 communication. For instance, the vehicle control apparatus 200 can perform 1:n communication by being connected to a plurality of mobile terminals 100.

In case that the vehicle control apparatus 200 is connected to the mobile terminal 100 using a wired interface, the vehicle control apparatus 200 can provide a single wired interface to each seat. If a single wired interface is provided to each seat, it is able to determine whether a user is seated on a corresponding seat. For instance, if the mobile terminal 100 is connected to the wired interface nearby a driver seat, it is able to determine that a passenger is seated on the driver seat. If the mobile terminal 100 is connected to the vehicle control apparatus 200 through the wired interface nearby a seat next to the driver, it is able to determine that a passenger is seated on the seat next to the driver. By determining a user seated location, the vehicle control apparatus 200 can adjust an in-vehicle environment appropriate for the user seated location. For instance, in case that a user is seated on the driver seat, it is able to control a height and/or inclination of the driver seat to be adjusted. For another instance, in case that a user is seated on the car seat next to the driver, it is able to control a height and/or inclination of the car seat next to the driver to be adjusted.

In case that the vehicle control apparatus 200 connected to the mobile terminal 100 through the wireless interface, the controller 240 can detect a user's boarding location using a user detected order and an initiated order of a communication with the mobile terminal 100. For instance, after a user has been detected from a driver seat, if another user is detected from a seat next to the driver [cf. FIG. 5], the control unit 240 can recognize that a first mobile terminal 100 having a communication initiated in the first place is the mobile terminal of the user seated on the driver seat and recognize that a second mobile terminal 100 having a communication initiated in the second place is the mobile terminal of the user seated on the seat next to the driver.

Yet, it is preferable that such an end device 300 providing the same experience to all users as an air conditioner, a navigation device, an audio device, a center fascia display and the like is controlled by a single mobile terminal 100. For instance, in case that room temperatures indicated by 4 user profiles respectively obtained from 4 mobile terminals 100 are different from one another, it may cause confusion in controlling the air conditioner with reference to which one of the different room temperatures. In order to prevent such confusion, the control unit 240 can control an air conditioner, a navigation device, an audio device, a center fascia display and the like based on the user profile obtained from a driver. This principle can be exactly applied to the first to fifth embodiments.

The control unit 240 can detect the mobile terminal 100 of the driver in one of a case that a user is recorded as the driver in the user profile [cf. FIG. 6], a case that the mobile terminal 100 is connected to the wired interface nearby the driver seat, and a case that the user detected order and the initiated order of the communication with the mobile terminal 100 are used.

Seventh Embodiment

The vehicle control apparatus 200 is connected to the mobile terminal 100 and is then able to share files with the mobile terminal 100. For instance, based on a user input, the control unit 240 can provide a multimedia content saved in the memory 210 to the mobile terminal 100 or receive a multimedia content saved in the mobile terminal 100. If a file saved in the mobile terminal 100 is saved in the vehicle control apparatus 200, a user of the mobile terminal 100 can be provided with a clouding computing environment for utilizing computing resources provided by the vehicle control apparatus 200.

As mentioned in the foregoing description of the sixth embodiment, in case that a plurality of the mobile terminals 100 are connected to the vehicle control apparatus 200, the vehicle control apparatus 200 can control files to be shared among the mobile terminals 100. For instance, the control unit 240 can control the wire/wireless communication unit 220 to transmit a multimedia content saved in the first mobile terminal 100 to the second mobile terminal 100 or to transmit a multimedia content saved in the second mobile terminal 100 to the first mobile terminal 100.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Accordingly, an apparatus for controlling a vehicle and method therefor according to the present invention are applicable to a system configured to perform wire/wireless communications between a vehicle and a mobile terminal.

What is claimed is:

1. An apparatus for controlling a vehicle, comprising:
  a sensing unit provided to each seat within the vehicle, and configured to detect boarding of the vehicle by one or more users;
  a user database configured to store at least one user profile of each of the one or more users, each of the at least one profile designating an initial operation of a corresponding one of at least one end device in the vehicle for each of the one or more users;
  a wire/wireless communication unit configured to communicate with one or more mobile terminals; and
  a control unit configured to:
    establish a communication channel with the one or more mobile terminals when the sensing unit detects that each user boards on the vehicle,
    detect a boarding seat position of each of the one or more users within the vehicle, among a driver's seat position and at least one seat position other than the driver's seat position, based on a detected seat position boarding order and an initiated order of establishing communication with the one or more mobile terminals,
    receive mobile terminal identification information from each of the one or more mobile terminals through the communication channel,
    extract, from the user database, one or more user profiles matching the mobile terminal identification information received from each of the one or more mobile terminals, and
    in response to the detected boarding seat position of each of the one or more users, control the at least one end device to operate in accordance with the initial operation designated for the one or more user profiles.

2. The apparatus of claim 1, wherein the sensing unit comprises at least one of a proximity sensor configured to detect whether a corresponding user one or more users is proximately located, a pressure sensor configured to be pressurized if the corresponding user is seated on a seat, or a door open/close sensor configured to detect whether a vehicle door is open or closed.

3. The apparatus of claim 1, wherein the mobile terminal identification information comprises at least one of a phone number of the mobile terminal, an IMEI (international mobile equipment identity) of the mobile terminal or a serial number of the mobile terminal.

4. The apparatus of claim 1, wherein the mobile terminal identification information comprises at least one of a face image of the user and a fingerprint of the user.

5. The apparatus of claim 1, wherein the at least one end device comprises an electronic motor configured to adjust a height of a car seat in the vehicle or inclination of a back support of the car seat in the vehicle.

6. The apparatus of claim 5, wherein the at least one user profile comprises at least one of an initial height level of the car seat or an initial inclination level of the back support of the car seat.

7. The apparatus of claim 1,
  wherein the at least one end device comprises a navigation device, and
  wherein the control unit is configured to automatically set a destination of the navigation device in accordance with data received from the one or more mobile terminals.

8. The apparatus of claim 7, wherein the control unit is configured to set the destination of the navigation device based on a keyword extracted from a webpage access record received from the one or more mobile terminals.

9. The apparatus of claim 8, further comprising:
  an address database configured to store a place and an address of the place,
  wherein the control unit is configured to extract the place matching the extracted keyword from the address database and then set the address of the extracted place as the destination.

10. The apparatus of claim 7, further comprising:
  a memory configured to save a phonebook received from the one or more mobile terminals, the phone book including a phone number and an address corresponding to the phone number,
  wherein the control unit is configured to set the destination of the navigation device based on the address, extracted from the phonebook, which matches to the phone number extracted from the call record received from the one or more mobile terminals.

11. The apparatus of claim 8, wherein if the communication channel is established, the control unit is configured to control the wireless communication unit to synchronize the phonebook with the one or more mobile terminals.

12. The apparatus of claim 7, wherein, if the control unit receives a user schedule list including a start time and a held place from the one or more mobile terminals, the control unit is configured to set the destination of the navigation device based on the held place of a next schedule extracted from the user schedule list.

13. The apparatus of claim 7, wherein the control unit is configured to determine the next schedule as a schedule having the start time arriving in an earliest time with reference to a current time in the schedule list.

14. The apparatus of claim 12, further comprising an address database storing a place and an address of the place, wherein the control unit is configured to extract the address of the held place of the next schedule from the address database and then set the destination of the navigation device based on the extracted address.

15. A method of controlling a vehicle by an apparatus having a sensing unit provided to each seat within the vehicle and configured to detect boarding of the vehicle by one or more users, the apparatus further including a user database configured to store at least one user profile of each of the one or more users, each of the at least one profile designating an initial operation of a corresponding one of at least one end device in the vehicle for each of the one or more users, the apparatus further including a wire/wireless communication unit configured to communicate with one or more mobile terminals, the apparatus further including a control unit, the method comprising:
  establishing a communication channel with the one or more mobile terminals when the sensing unit detects that each user boards on the vehicle;
  detecting a boarding seat position of each of the one or more users within the vehicle, among a driver's seat position and at least one seat position other than the driver's seat position, based on a detected seat position boarding order and an initiated order of establishing communication with the one or more mobile terminals;
  receiving mobile terminal identification information from each of the one or more mobile terminals through the communication channel;
  extracting, from the user database, one or more user profiles matching the mobile terminal identification information received from each of the one or more mobile terminals; and
  in response to the detected boarding seat position of each of the one or more users, controlling the at least one end device to operate in accordance with the initial operation designated for the one or more user profiles.

16. The apparatus of claim 1,
  wherein the one or more users comprises two or more users, and
  wherein the one or more mobile terminals comprises two or more terminals.

17. The method of claim 15,
  wherein the one or more users comprises two or more users, and
  wherein the one or more mobile terminals comprises two or more terminals.

\* \* \* \* \*